(12) United States Patent
Melnik et al.

(10) Patent No.: US 10,457,304 B2
(45) Date of Patent: Oct. 29, 2019

(54) SYSTEM AND METHOD FOR DETERMINING TRAIN INFORMATION RELATIVE TO A TRAIN MOVING ALONG A RAILWAY TRACK

(71) Applicant: ALSTOM Transport Technologies, Saint-Ouen (FR)

(72) Inventors: Laura Melnik, Melbourne, FL (US); James Kiss, Melbourne, FL (US); Jared Cooper, Melbourne, FL (US)

(73) Assignee: ALSTOM Transport Technologies, Saint-Ouen (FR)

( * ) Notice: Subject to any disclaimer, the term of this patent is extended or adjusted under 35 U.S.C. 154(b) by 43 days.

(21) Appl. No.: 15/834,397

(22) Filed: Dec. 7, 2017

(65) Prior Publication Data
US 2019/0176861 A1    Jun. 13, 2019

(51) Int. Cl.
*B61L 25/02* (2006.01)
*G01P 5/06* (2006.01)
*F03D 17/00* (2016.01)
*F03D 9/32* (2016.01)

(52) U.S. Cl.
CPC .......... *B61L 25/021* (2013.01); *B61L 25/025* (2013.01); *F03D 9/32* (2016.05); *F03D 17/00* (2016.05); *G01P 5/06* (2013.01)

(58) Field of Classification Search
CPC .......... F03D 9/32; F03D 17/00; B61L 25/025; B61L 25/021; G01P 5/06
USPC ....................................... 73/861.85
See application file for complete search history.

(56) References Cited

U.S. PATENT DOCUMENTS

| 914,389 A | * | 3/1909 | Davis ........................ B61L 5/04 246/257 |
| 2016/0052531 A1 | * | 2/2016 | Boukari ................ B61L 23/041 348/148 |

* cited by examiner

*Primary Examiner* — Nathaniel T Woodward
(74) *Attorney, Agent, or Firm* — Troutman Sanders LLP

(57) ABSTRACT

System for determining train information relative to a train moving along a railway track having a pressure measuring device placed along the railway track and arranged to measure the speed of an airflow generated by the train when moving on the railway track, and to generate a speed signal; and a controller arranged to receive said speed signal and to determine train information relative to the train in function of said speed signal.

15 Claims, 4 Drawing Sheets

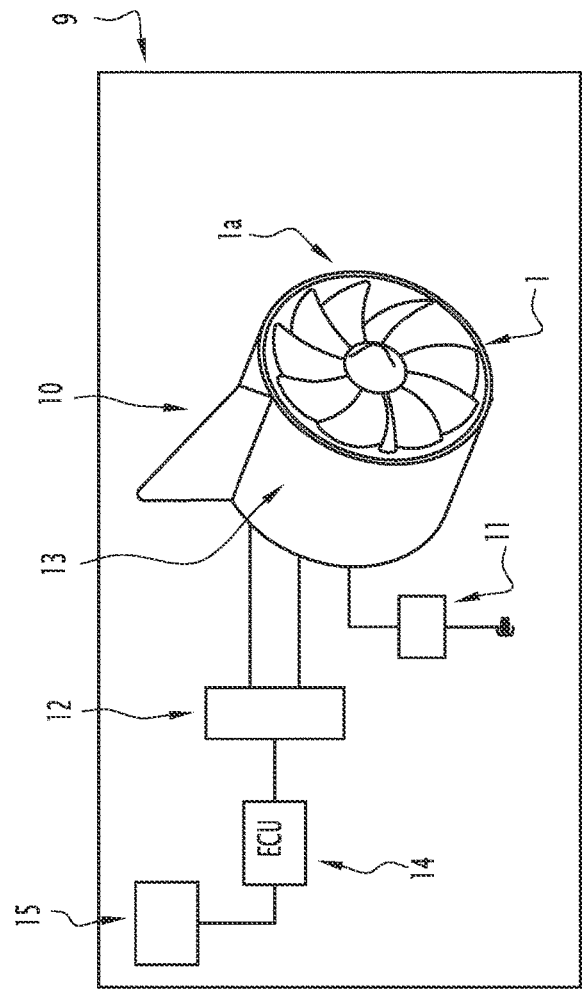
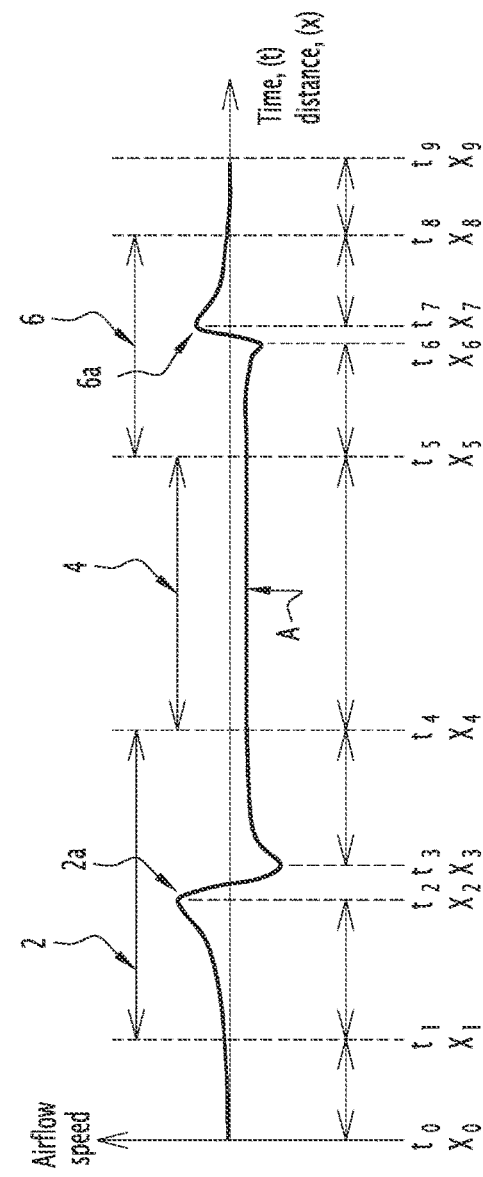
FIG.1
FIG.2

SYSTEM AND METHOD FOR DETERMINING TRAIN INFORMATION RELATIVE TO A TRAIN MOVING ALONG A RAILWAY TRACK

FIELD OF THE INVENTION

The present invention relates to a system and a method for determining train information relative to a train moving along a railway track.

BACKGROUND

It is generally known that, in order to control and manage trains moving along railway tracks, it is necessary to exactly known data relative to each train such as the location, the speed, the length and the moving direction.

In fact, a problem connected to the management of train services is the lack of knowledge of the exact location of a train in areas of low density of population/infrastructure. In such remote locations it is often too expensive and/or difficult to run wires for communications or power supply for measuring devices arranged to gather information related to trains.

Various techniques and devices have been usually employed for determining this train information, but they are complex to install and expensive. An example of these techniques is the crossing gate track circuit that measures a change of impedance in the circuit itself as the train approaches.

There is therefore the need to have a system and a method for determining train information relative to a train moving along a railway track which is easy to apply, cheap and which requires low maintenance, thus overcoming the limitations of the prior art solutions.

SUMMARY

These and other objects are achieved by a system for determining train information relative to a train moving along a railway track having the characteristics defined in the claims and by a method for determining train information relative to a train moving along a railway track having the characteristics defined in other claims.

Examples of the invention are the subject matter of other claims, whose content is to be understood as forming an integral part of the present description.

BRIEF DESCRIPTION OF THE DRAWINGS

Further characteristics and advantages of the present invention will become apparent from the following description, provided merely by way of non-limiting example, with reference to the enclosed drawings, in which:

FIG. 1 is a perspective view of a wind turbine;

FIG. 2 shows a curve representing the speed of an airflow, generated by a train passing next to a static object, as a function of time;

DETAILED DESCRIPTION

Figure 3:
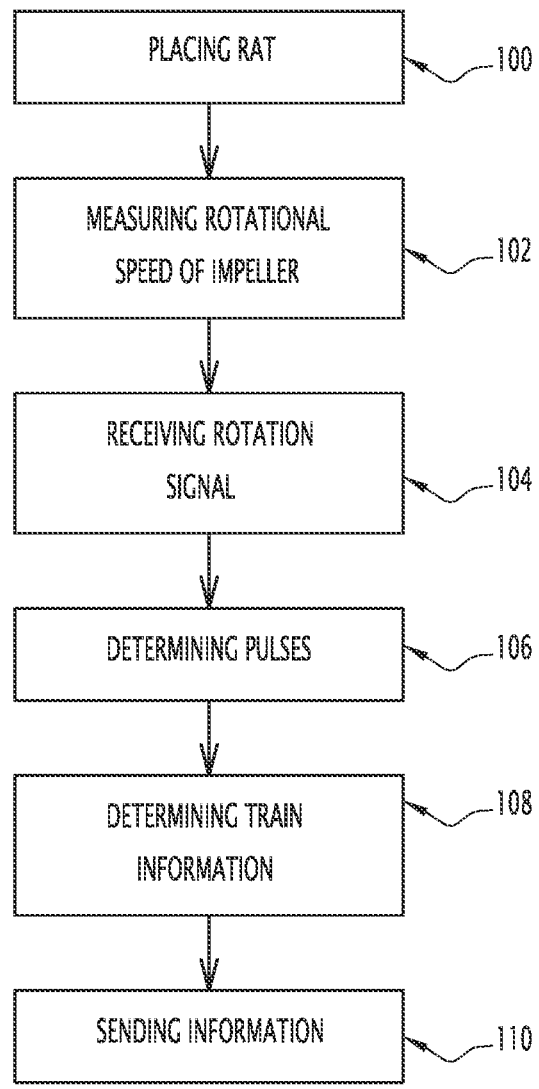
FIG. 3 is a block diagram of the steps to be performed by a method for determining information relative to a train according to the present invention.

Briefly, the system of the present invention is based on the use of a wind turbine, for example a Ram Air Turbines (RAT) along a railway track.

Ram Air Turbines (RAT) have been widely used to generate backup power to aid aircrafts when complete loss of power occurs. For example, the RATs were heavily used on military aircraft in the 1960s. However, RATs have never been employed in the railway field.

The system and method of the present invention are preferentially based on the idea of placing a wind turbine, for example a RAT, along a railway track to determine train information by analyzing an airflow generated by a train passing next to the wind turbine itself.

Other turbines and/or pressure measuring devices capable of measuring pressure waves can be used instead of the RAT.

In the following of the description reference will be made to wind turbine and notably RATs as an example of the invention, however, this should not be interpreted as a limiting feature and other pressure measuring devices per se known can be used.

It has been noted that a train, when moving along a railway track, due to its mass and aerodynamics, produces an airflow whose speed, as a function of time, has two pulses. By using the measure of these two pulses it is possible to mathematically determine train information as herein below detailed.

The pressure measuring devices above cited are capable of measuring said airflow speed.

FIG. 1 is a perspective view of a wind turbine, for example a RAT 1 arranged to be placed along a railway track to determine information relative to a train moving along the railway track, by analyzing an airflow generated by the movement of the train along the railway track.

The wind turbine 1 has an impeller 1a which rotates when hit by the airflow. The rotational direction of the impeller 1a depends preferentially on the direction of the airflow, which in turn depends on the moving direction of the train.

The wind turbine 1 is connected to a sensor 12 arranged to measure the angular rotational speed of the impeller 1a. The sensor 12 is in turn connected to a control unit 14 arranged to calculate, from such angular rotational speed, the speed of the airflow as a function of the time and to determine, from such speed of the airflow, information relative to the train, as here below explained.

Advantageously, the wind turbine 1, the sensor 12 and the control unit 14 are included in a block detection 9.

In an alternative embodiment of the invention, the method for determining information relative to a train moving along a railway track of the present invention is performed by a control unit of the train or by a control unit of a remote control center cooperating with the train. In such cases, there is no control unit 14 directly connected to the sensor 12.

The wind turbine is a self-powered device: the force exercised on the impeller 1a by the airflow produced by the passage of a train is converted by the wind turbine 1 into energy available for supplying the wind turbine 1 itself. For example, the wind turbine 1 is connected to a battery 11 which is re-charged by the movements of the impeller 1a, so as to store energy to be used to supply the sensor 12 and the control unit 14.

The wind turbine 1 uses the airflow to generate power for the system, so there is no need to add any additional infrastructure and the maintenance and installation of the wind turbine 1 is inexpensive.

As an alternative, the wind turbine 1 is provided with solar panels 13 for the production of energy.

FIG. 2 shows a curve representing the speed of an airflow, generated by a train passing next to a static object, as a function of time.

A train, when passing next to a stationary object, produces an airflow represented by curve A, which has three distinct regions: in a first region 2, called nose pulse region, the curve A has a nose pulse 2a generated in correspondence of the head of the train, in particular the engine of the train or a first unit of a train consist.

In the next region 4, called constant region, the curve A is constant and it corresponds to the airflow coming from the body of the train.

In the next region 6, called tail pulse region, the curves A has a tail pulse 6a, generated in correspondence of the tail of the train, or in correspondence of the last unit of a train consist.

The curve A of FIG. 2 starts at an initial time t0, then, at a first time instant t1, the nose pulse region 2 begins. In a subsequent second time instant t2, the nose pulse 2a starts and it ends in a third time instant t3. In a fourth time instant t4 the nose pulse region 2 ends and the constant region 4 begins, up to a fifth time instant t5, when the tail pulse region 6 begins. At a sixth time instant t6 the tail pulse 6a starts and it ends in a seventh time instant t7. The tail pulse region 6 ends in an eighth time instant t8 and finally the curve A ends in a ninth time instant t9.

The curve A, in the constant region 4, is correlated to the speed the train, as herein below disclosed with reference to FIG. 3 which is a block diagram of the steps to be performed by a method for determining information relative to a train moving along a railway track according to the present invention.

In a first step 100, a wind turbine 1 (or any pressure measuring device) is placed along a railway track. The wind turbine 1 of the system of the present invention advantageously comprises a rudder 10 and it is connected to the sensor 12 arranged to measure, in a step 102, the angular rotational speed of the impeller 1a. The sensor 12 is in turn connected to the electronic control unit 14 arranged to receive, in a step 104, a rotation signal coming from the sensor 12 and representative of such angular rotational speed.

The rudder 10 makes sure that the wind turbine 1 is correctly facing the wind and this helps to determine the direction of travel of the train.

At this point, in a further step 106, the control unit 14 determines, from this rotation signal, the associated speed of the airflow as a function of time and identifies the nose pulse 2a and the tail pulse 6a. The control unit 14 determines therefore the respective second time instant t2 and seventh time instant t7 of the nose pulse 2a and tail pulse 6a.

In addition to this, the control unit 14 also determines, from the sign of the rotational signal, or from another rotational signal relative to the direction of rotation of a wind vane or a head wind turbine fixed preferentially to the wind turbine, the moving direction of the train 50.

Advantageously the wind vane and/or the head wind turbine are of reduced size compared to the rest of the wind turbine.

In alternative examples of the invention including a pressure measuring device different from the wind turbine 1, a speed signal is obtained, said speed signal corresponding to the rotational signal above indicated and representing the speed of the airflow as a function of time as above disclosed.

In alternative examples of the invention including a pressure measuring device different from the wind turbine 1, a pressure wave is directly obtained from the pressure measuring device in step 102, and in step 106 the control unit 14 determines, from the pressure wave, the associated speed of the airflow as a function of time and identifies the nose pulse 2a and the tail pulse 6a.

After that, in a step 108, the control unit 14 determines, in a manner per se known and based on the time instant t2 and t7 of the nose pulse 2a and the tail pulse 6a and preferentially also on the amplitude of the pulses and/or airflow speed measured in the constant region, the speed of the train and its length.

The location of the train is derived by the knowledge of the location of the wind turbine 1 along the railway track.

With reference to the speed and length of the train, the difference between the seventh time instant t7 and the second time instant t2 is calculated and if the result is out of a predetermined range, for example 10 s-80 s, an alarm is sent to the train control unit because this means that either the train is moving too fast, or it has lost part of the consists, or it is moving too slowly.

If, on the contrary, the result is within said predetermined range, the speed of the airflow in the pulse region is directly correlated to the speed of the train. In addition, the length of the train is obtained, in a manner per se known, as a function of the time between the nose and the tail pulse and the speed of the train.

At this point, the collected information is preferably sent, in a step 110 and in a manner per se known thanks to a transmitting device 15 connected to the control unit 14, to the control unit of the train, i.e. notably to a train operator on-board and notably the driver.

Preferentially the control unit of the train transmits the information to a remote control center. As an alternative, the collected information is directly sent to the remote control center.

In an alternative example of the invention, the steps of the method above disclosed are performed directly by the control unit of the train, or by the remote control center, which are arranged to directly receive the rotation signal.

Figure 4:
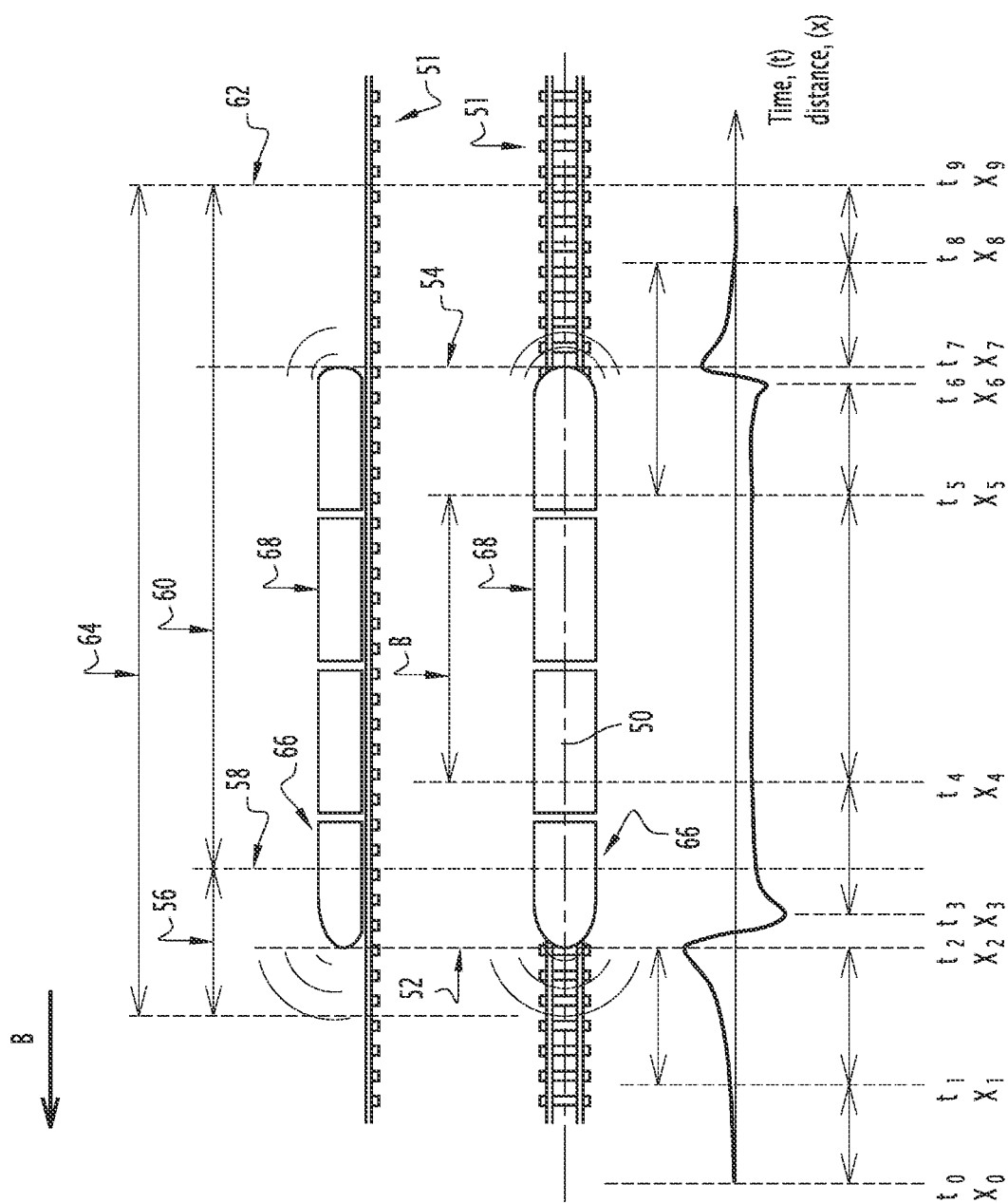
FIG. 4 shows the curve of FIG. 2 and a lateral and a top view of a train.

FIG. 4 shows, in a bottom part, the curve A of FIG. 2 and, in an upper part, a lateral and a top view of a train 50 moving in a direction B along a railway track 51. A first vertical line 52 indicates the correspondence of the nose of the train 50 with the nose pulse 2a, while a second vertical line 54 indicates the correspondence between the tail of the train 50 and the tail pulse 6a.

A first area 56 comprised between the first vertical line 52 and a third vertical line 58 represents a head region, i.e. the flow field coming from the passage of the head of the train 50.

A second area 60 comprised between the third vertical line 58 and a fourth vertical line 62 represents a tail region, i.e. the flow field coming from the passage of the tail of the train 50.

A third area 64, which corresponds to the sum of the first area 56 and the second area 60, represents the complete train region, i.e. the flow field coming from the complete passage of the train 50.

The wind generated by the train 50 begins towards the head of the train, as shown in a first region 66, and remains in a second region 68 surrounding the train 50.

As clear from the above, if the position of the wind turbine 1 along the railway track 51 is known, it is possible to obtain the location of the train 50 and of its head and tail, by simply referring to the occurrence of the nose positive pulse 2a and tail positive pulse 6a.

The design of the wind turbine 1 depends on the location where it has to be placed. Two different categories of locations can be identified: locations wherein the nominal airflow is less than or equal to 4 mph belong to a first category; locations wherein the nominal airflow is greater than 4 mph belong to a second category.

Advantageously, the nominal airflow is the airflow which is usually present when there is no train 50 moving on the railway track 51. The nominal airflow is used to keep the battery 11 of the wind turbine 1 charged, by rotating blades 1a.

Figure 5:
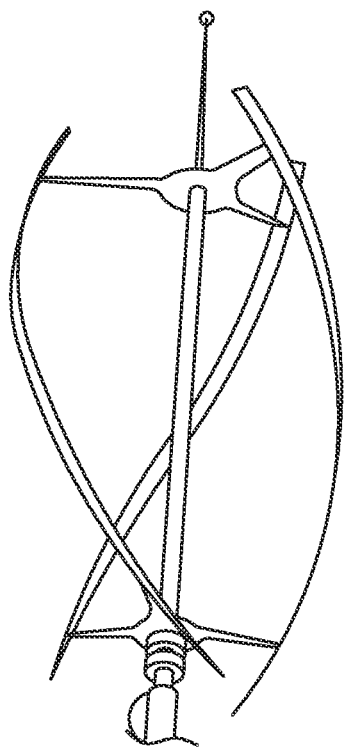
FIG. 5 shows a quiet revolution Qr6(5), a vertical axis wind turbine.

In areas wherein the nominal airflow is less than or equal to 4 mph, for example in valleys, tunnels etc., the battery 11 is of a predetermined type suitable for holding a charge with a minimal discharge rate, for example a lead acid battery. In areas wherein the nominal wind is greater than 4 mph, the impeller 1a of the wind turbine 1 comprises blades similar to the Quiet Revolution Qr6(5), a vertical axis wind turbine, which is shown in FIG. 5.

These blades are vertically mounted with a spiral blade array. The Qr6 is based on the Gorlov Helical Turbine and it is manufactured as a generator operating with an airflow speed ranging from 4.5 to 56 mph, and it comprises an automatic breaking system arranged for stopping the turbine if either the airflow exceeds a predetermined threshold speed (preferably, 116 mph) or if it detects any uncharacteristic movement of the turbine.

These vertical turbines do not require any device to align with the airflow.

Clearly, the principle of the invention remaining the same, the embodiments and the details of production can be varied considerably from what has been described and illustrated purely by way of non-limiting example, without departing from the scope of protection of the present invention as defined by the attached claims.

The invention claimed is:

1. A system determining train information relative to a train moving along a railway track comprising:
   a pressure measuring device placed along the railway track measuring a speed of an airflow generated by the train when moving on the railway track, and generating a speed signal;
   a controller arranged to receive said speed signal and to determine train information relative to the train as a function of said speed signal,
   wherein the controller determines train information by determining the speed of the airflow as a function of time and determining two pulses of said speed of the airflow corresponding to the head and to the tail of the train, respectively.

2. The system of claim 1, wherein the train information comprises the location of the train along the railway track, the speed of the train and the length of the train.

3. The system of claim 1, wherein the controller further determines train information by determining an amplitude of the airflow speed in a constant region,
   wherein the amplitude of the airflow speed is substantially constant, comprised between the two pulses, so as to obtain the speed of the train and also the length of the train in function of the time difference between the two pulses.

4. The system of claim 1, wherein the controller determines train information by determining, based on the sign of the speed signal, the moving direction of the train.

5. The system of claim 1, wherein the pressure measuring device is a ram air turbine.

6. The system of claim 5, wherein the ram air turbine further comprises a lead acid battery for a power supply.

7. The system of claim 5, wherein the ram air turbine recharges the battery while an impeller of the ram air turbine is rotating, so as to store energy to be used to supply the pressure measuring device and the controller.

8. The system of claim 5, wherein the ram air turbine comprises blades vertically mounted with a spiral blade array.

9. A method for determining train information relative to a train moving along a railway track comprising the steps of:
   placing a pressure measuring device along the railway track, said pressure measuring devices measuring a speed of an airflow generated by the train moving on the railway track and generating a speed signal; and
   determining, from said speed signal, train information relative to the train, by determining the speed of the airflow as a function of time and determining two pulses of said speed of the airflow corresponding to the head and to the tail of the train, respectively.

10. The method of claim 9, wherein the step of determining information relative to the train comprises:
    determining the speed of the airflow as a function of time; and
    determining two pulses of said speed of the airflow corresponding to the head and to the tail of the train, respectively.

11. The method of claim 10, wherein the step of determining train information further comprises:
    determining an amplitude of the airflow speed in a constant region,
    wherein the amplitude of the airflow speed is substantially constant, comprised between the two pulses, so as to obtain the speed of the train and also the length of the train as a function of the time difference between the two pulses.

12. The method of claim 10, further comprising determining a location of the trains head and tail in the railway track based on the location of the two pulses with respect to the position of the pressure measuring device.

13. The method of claim 10, further comprising detecting a head of the train based on the occurrence of a head pulse corresponding to the head of the train.

14. The method of claim 10, further comprising detecting a tail of the train based on the occurrence of a tail pulse corresponding to the tail of the train.

15. The method of claim 9, wherein the step of determining information relative to the train comprises determining the moving direction of the train based on the sign of said speed signal.

* * * * *